(12) United States Patent
Subbarao et al.

(10) Patent No.: US 8,612,289 B2
(45) Date of Patent: Dec. 17, 2013

(54) METHODS AND SYSTEMS FOR PAYING WITH LOYALTY CURRENCY DURING ONLINE PAYMENT

(75) Inventors: Murali B. Subbarao, Saratoga, CA (US); Shankar A. Chittoor, Fremont, CA (US); Allwyn Lobo, Campbell, CA (US); Ravindra G. Gore, Fremont, CA (US)

(73) Assignee: Billeo, Inc., Santa Clara, CA (US)

( * ) Notice: Subject to any disclaimer, the term of this patent is extended or adjusted under 35 U.S.C. 154(b) by 102 days.

(21) Appl. No.: 13/041,343

(22) Filed: Mar. 4, 2011

(65) Prior Publication Data
US 2012/0226535 A1     Sep. 6, 2012

(51) Int. Cl.
*G06Q 30/00*     (2012.01)
*G05B 19/418*    (2006.01)

(52) U.S. Cl.
USPC ............... 705/14.28; 705/14.3; 705/14.33; 705/14.27

(58) Field of Classification Search
USPC ...................................... 705/14.28
See application file for complete search history.

(56) References Cited

U.S. PATENT DOCUMENTS

| | | | |
|---|---|---|---|
| 6,327,573 B1* | 12/2001 | Walker et al. | 705/14.36 |
| 2001/0034720 A1* | 10/2001 | Armes | 705/65 |
| 2002/0026412 A1* | 2/2002 | Kabin | 705/39 |
| 2005/0021399 A1* | 1/2005 | Postrel | 705/14 |

OTHER PUBLICATIONS

Drèze et al., "Using Combined-Currency Prices to Lower Consumers' Perceived Cost", J. Marketing Research, vol. 59, pp. 59-72, Feb. 2004.*
"Dynamic Currency Conversion—a First Data service", CyberSource, Inc., 2007; found online at cybersource.com.*
Corel Corp., "WordPerfect 9" user guide, Copyright © 1999 to Corel Corp.*
Liptakova, "Slovaks Collect More Loyalty Cards", Slovak Spectator, Nov. 30, 2009, on line at apectator.sme.sk/articles/view/37254/24/slovaks_collect_more_loyalty_cards.html.*

* cited by examiner

*Primary Examiner* — Victoria Vanderhorst
*Assistant Examiner* — Scott C Anderson
(74) *Attorney, Agent, or Firm* — Balser & Grell IP Law, L.L.P.; Benjamin A. Balser

(57) ABSTRACT

Methods and systems for paying with loyalty currency at a merchant website by a user using a browser app are provided. The user is presented with the loyalty currency balance information based on the loyalty currency units available in the loyalty currency account. Thereafter, the user is presented with an option to pay for the purchase transaction using the loyalty currency. The user may select the option of paying for the purchase transaction using the loyalty currency, thereby redeeming the loyalty points.

29 Claims, 9 Drawing Sheets

METHODS AND SYSTEMS FOR PAYING WITH LOYALTY CURRENCY DURING ONLINE PAYMENT

TECHNICAL FIELD

The present disclosure is generally related to electronic transactions and, more particularly, is related to paying with loyalty currency during online payment.

BACKGROUND

Loyalty systems are conventionally used by various commercial organizations to increase customer retention as well as to increase the customer base. Examples of commercial organizations may be one of a financial institution, a credit card company, an airline, a super mart, a grocery store, a convenience store, and the like. Loyalty systems reward a customer with loyalty points in return for usage of a product or a service marketed by a commercial organization. For example, several financial institutions that issue credit cards to customers reward them with loyalty points when the customer uses a credit card for shopping, dining, and so forth. The customer is able to redeem the points on the financial institution's website for goods and services from a variety of merchants assembled by the financial institution. Further, an example of a non-financial commercial organization issuing reward points may be an airline that rewards its customers with travel miles. The travel miles may be redeemed by the customers for that airline service when they have a minimum requisite number of travel miles in their account.

Typically, commercial organizations provide a limited range of options for redeeming the loyalty points. For example, several commercial organizations provide an online store linked to their websites where the customers may redeem their loyalty points by buying from the products offered at the online store. However, this facility of redeeming points at an online store suffers from the major drawback that only a limited range of products are available for buying at the online store. A customer not having any need or interest for the offered range of products might find limited or no value in the loyalty points. This gradually leads to deterioration in the customer's perceived value of the loyalty system, which further diminishes the loyalty to the brand. In an extreme though plausible scenario, this might lead the customer to switch to another commercial organization offering a better reward system. Thus, the purpose of the loyalty system is defeated. Further, when the loyalty points rewarded by the commercial organization are not redeemed regularly, the financial liability of the commercial organization increases, affecting their financial statements.

Moreover, the link to the online store where the customer may redeem loyalty points is generally present on the website of the commercial organization. A customer who intends to redeem the loyalty points has to exclusively visit the website of the commercial organization and thereafter begin shopping using a less acquainted online store interface. The customers well set in their online shopping habits, with respect to the merchant websites that they typically visit and the shopping experience that they are accustomed to, find it counter intuitive to shop at the commercial organization's online store. Thus, a significant shift in the shopping habits of the customers is required for the loyalty points systems to function effectively.

Alternatively, a particular merchant website may collaborate with a specific commercial organization, offering a loyalty points program, for enabling paying with points. Typically, in this scenario, the customer may purchase products using loyalty points accumulated with the specific commercial organization for any product on the merchant website. However, the major limitation of such an arrangement is that it requires tight integration between the merchant and the commercial organization. This limits the use of the loyalty points to a small set of merchant websites.

SUMMARY

Example embodiments of the present disclosure provide systems for paying with loyalty currency during online payment using a browser app. Briefly described, in architecture, one example embodiment of the system, among others, may be implemented as follows: a loyalty currency client, a tracking module, a presentation module, a currency converter module, and a transaction report module.

Embodiments of the present disclosure may also be viewed as providing methods for paying with loyalty currency during online payment using a browser app. In this regard, one embodiment of such a method, among others, may be broadly summarized by the following steps: presenting without a user input, loyalty currency balance information for the user corresponding to a program sponsor, when the user visits the one or more merchant websites. The steps further include capturing total cost of items being purchased by the user at a merchant website and converting the total cost of items into one or more loyalty currency units based on a set of one or more conversion rules stored in a conversion table. Further, the user is presented with a loyalty currency payment option based on loyalty currency balance information for the user. Thereafter, a payment method details are filled in a payment form based on a user response to the loyalty currency payment option. Further, purchase transaction information is reported to the program sponsor after the purchase has been confirmed by the merchant website.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

In light of the above described deficiencies, there is a need for systems and methods that may facilitate an easier and more broadly usable system for redeeming of loyalty points, thereby increasing the customer perceived value of the loyalty program and the loyalty of the customer to the commercial organization. The systems and methods should enable the users to redeem their loyalty points at any merchant website that the user intends to use for online shopping. Further, there is a need for systems and methods that may give the user freedom to buy a product of their choice independent of the availability of the product on a particular commercial organization's online store for redeeming loyalty points. Further, there is a need for systems and methods that will spare the commercial organization the hassles of maintaining an online store such as maintaining an inventory, regular maintenance of the website, and so forth. Further, there is a need for systems and methods that may not require the complex integration between a merchant website and the commercial organization to enable use of loyalty points to purchase goods on the merchant site.

The present disclosure relates to enabling paying with loyalty currency rewarded by a commercial organization at any merchant website. However, the current state of the art discloses that commercial organizations enable redemption of points only on their online stores. Also, when redemption of points is enabled at a merchant website, it is only through a tight integration between the merchant website and the commercial organization. In light of this, the embodiments of the present disclosure, enable paying with loyalty currency over any merchant website using a browser app, without requiring integration between the commercial organization and the merchant website. Further, the functioning of the browser app is independent of any merchant website, which implies that the browser app is not dependent on the design and/or implementation levels of the merchant websites.

Figure 1:
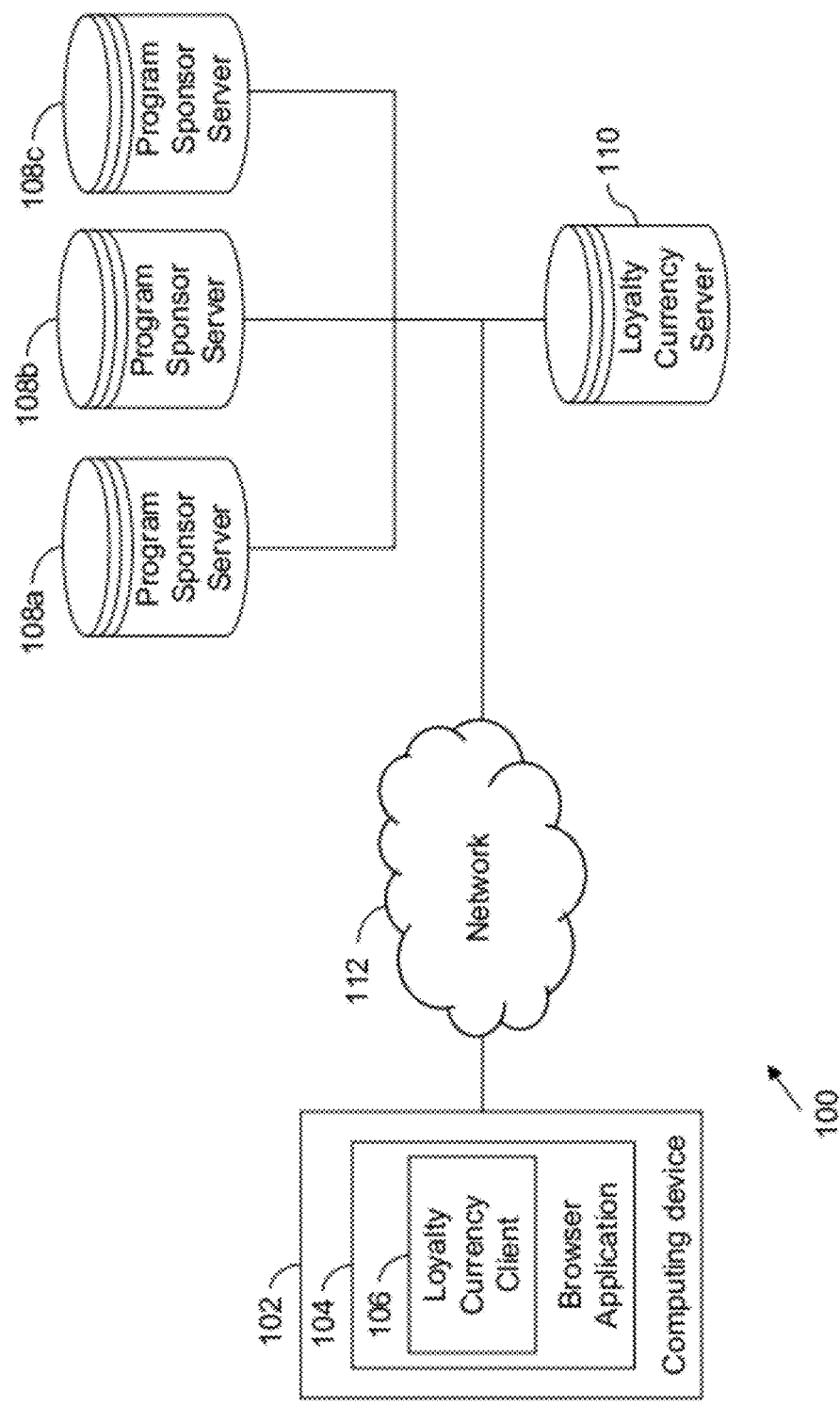
FIG. 1 is a block diagram of a system for paying with loyalty points during online shopping using a browser app, in accordance with an example embodiment of the present disclosure.

Referring now to FIG. 1, a system for paying with loyalty points during online shopping using a browser app, in accordance with an example embodiment of the present disclosure is shown. System 100 includes computing device 102, browser app 104, loyalty currency client 106, program sponsor servers 108a, 108b, and 108c, loyalty currency server 110, and network 112.

Computing device 102 is used by a user for visiting the various websites for online shopping. In an embodiment of the present disclosure, computing device 102 is at least one of a personal computer (PC), a laptop, a notebook, a mobile phone, a smart phone, a tablet PC, a personal digital assistant (PDA) and the like. Further, browser app 104 is installed at computing device 102. Browser app 104 enables the user to pay with loyalty currency during online shopping at any merchant website by interacting with program sponsor servers 108a, 108b, and 108c over network 112. In an embodiment of the present disclosure, browser app 104 is at least one of a toolbar, a plug-in, an add-on, an extension and the like. In an example embodiment of the present disclosure, browser app 104 resides in a browser such as Internet Explorer, Mozilla Firefox, Google Chrome, Apple Safari, and the like. In another example embodiment of the present disclosure, browser app 104 is a mobile app that is installed on a mobile device that embeds a browser such as the one listed above. Further, in an example embodiment of the present disclosure, the network is the internet. In an example embodiment of the present disclosure, the loyalty currency is provided by one of the program sponsors. In an example embodiment of the present disclosure, the program sponsor is at least one of a banking institution, a credit card company, a financial institution, an airline, a super market, a grocery store, a convenience store, and the like. In an example embodiment of the present disclosure, the loyalty currency includes loyalty points, membership points, reward points, mileage points, miles and the like. In another example embodiment of the present invention, the loyalty currency is any fungible means such as e-vouchers, coupons, and the like.

Further, browser app 104 may host loyalty currency client 106. Loyalty currency client 106 tracks the online shopping behavior of the user which includes tracking the websites the user visits and identifying merchant websites the user visits for online shopping and the merchant websites at which the user prefers to use the loyalty currency. Additionally, loyalty currency client 106 interfaces with program sponsor servers 108a, 108b, and 108c using network 112 for obtaining the loyalty currency balance information for a user. The operations performed by loyalty currency client 106 have been explained in detail in conjunction with FIG. 2.

Further, program sponsor servers 108a, 108b, and 108c provide the loyalty currency balance information corresponding to a user to loyalty currency client 106. Additionally, program sponsor servers 108a, 108b, and 108c provide a set of conversion rules for converting the total cost of items purchased into loyalty currency units corresponding to a merchant website that the user intends to use for redeeming the loyalty points. Further, program sponsor servers 108a, 108b, and 108c provide a predetermined threshold of loyalty currency balance required for the user to be able to redeem the loyalty points. In an example embodiment of the present invention, the program sponsor servers 108a, 108b, and 108c may provide one or more business rules such as a list of merchant websites where the loyalty points may be redeemed, a list of merchant websites where the loyalty points may not be redeemed, list of type of card members, such as gold card member, platinum card member, who may avail the loyalty points redeeming service, the time of the year during which this loyalty points redeeming service is available, the categories of goods purchased for which this service is valid, and the like. Additionally, the program sponsor servers 108a, 108b, and 108c may provide a specific time frame, such as the time around major holidays, during which the service will be available. Although three servers 108A, 108B, and 108C are provided in example embodiments, program sponsor server 108 may comprise a single server, two servers, or more than three servers, as well. Further, loyalty currency server 110 is connected to loyalty currency client 106. Loyalty currency server 110 hosts one or more rules for operating loyalty currency client 106. Loyalty currency server 110 has been explained in detail in conjunction with the FIG. 3.

Figure 2:
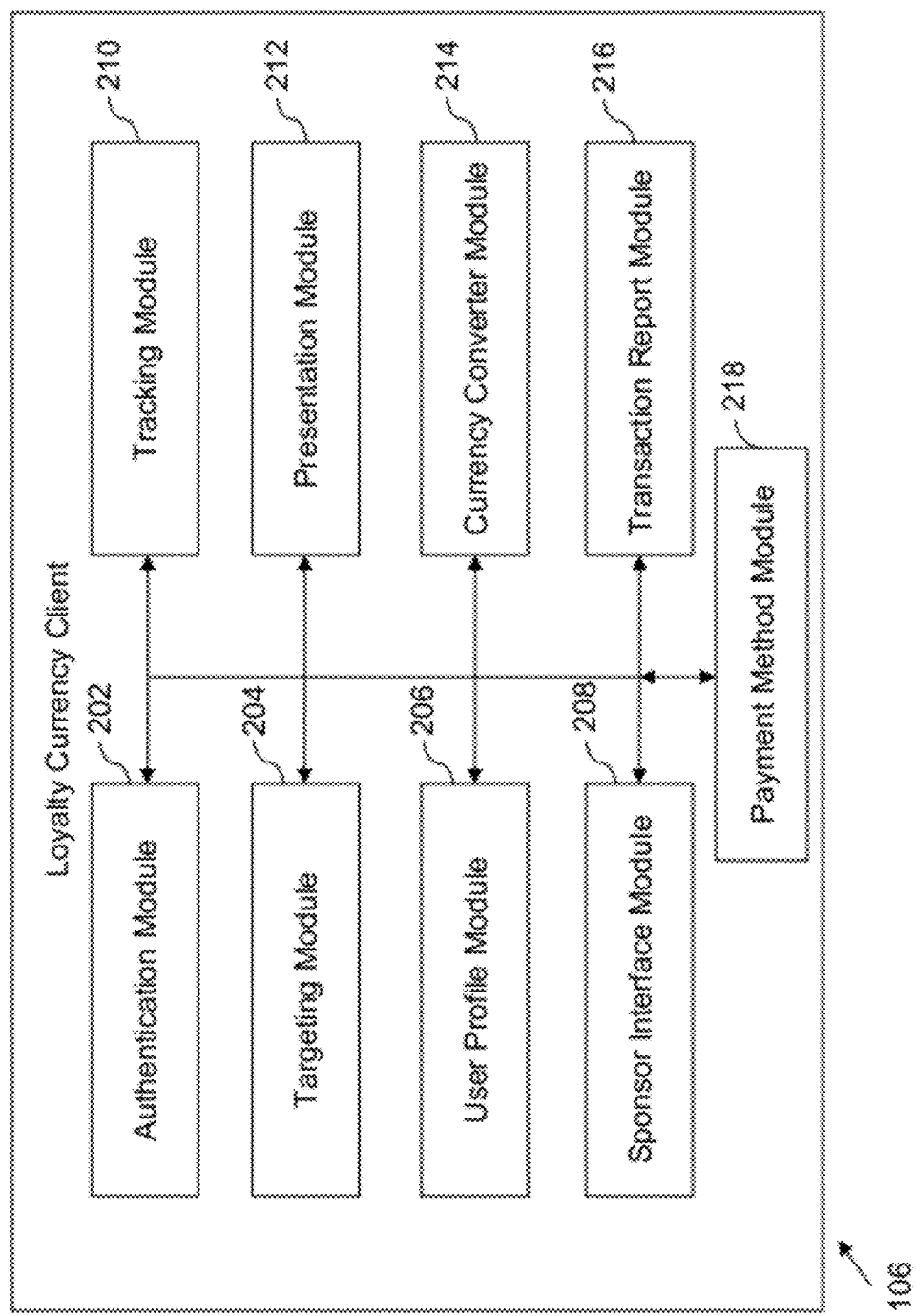
FIG. 2 is a block diagram of a loyalty currency client, in accordance with an example embodiment of the present disclosure.

Referring now to FIG. 2, loyalty currency client 106 is shown in detail, in accordance with an example embodiment of the present disclosure. Loyalty currency client 106 includes authentication module 202, targeting module 204, user profile module 206, sponsor interface module 208, tracking module 210, presentation module 212, currency converter module 214, transaction report module 216, and payment method module 218.

User profile module 206 periodically extracts user profile information from loyalty currency server 110 (refer FIG. 1) and program sponsor servers 108a, 108b, and 108c (refer FIG. 1). In an example embodiment of the present disclosure, the user profile information includes but is not limited to an account holder name, a credit card number, a debit card number, a Card Verification Value (CVV) number, an expiration date, a prepaid card number, a merchant card number, and the like. In an example embodiment of the present disclosure, user profile module 206 extracts user profile information corresponding to multiple users. In an example embodiment of the present disclosure, user profile module 206 periodically extracts loyalty currency balance information and predefined threshold corresponding to a user from at least one of program sponsor servers 108a, 108b, and 108c. In an embodiment of the present disclosure, user profile module 206 using web services extracts loyalty currency balance information and predefined threshold corresponding to a user from at least one of program sponsor servers 108a, 108b, and 108c. In an example embodiment of the present disclosure, user profile module 206 stores the loyalty balance information and predefined threshold corresponding to at least one of program sponsor servers 108a, 108b, and 108c.

Authentication module 202 authenticates at least one user with loyalty currency server 110 at the launch of browser app 104 (refer FIG. 1). In an embodiment of the present disclosure, the user is automatically authenticated with loyalty currency server 110 based on preference settings of the user. Subsequent to authentication, tracking module 210 is activated for tracking user's internet surfing activities. Thus, tracking module 210 tracks the activities of the user while the user is visiting one or more websites. Further, tracking module 210 may track the one or more merchant websites that the user visits. When the user visits a merchant website, tracking module 210 may inform targeting module 204. In an example embodiment of the present disclosure, tracking module 210 informs targeting module 204 that the user is visiting at least one merchant website belonging to a predefined list of merchant websites. In an example embodiment of the present disclosure, the predefined list of merchant websites is provided by at least one of program sponsor servers 108a, 108b, and 108c. Further, tracking module 210 may capture total cost of items to be purchased including shipping cost and taxes, if any, by the user at a merchant website. Tracking module 210 may provide the information corresponding to the total cost of items to be purchased including shipping cost and taxes, if any, to currency converter module 214 through targeting module 204. Additionally, tracking module 210 may track a user response to at least one loyalty currency payment option presented to the user by presentation module 212.

Presentation module 212 presents the user with loyalty currency balance information corresponding to a program sponsor without a user input. In an example embodiment of the present disclosure, the loyalty currency balance information includes number of loyalty currency units credited to the user by the program sponsor. In an example embodiment of the present disclosure, the loyalty currency balance information corresponds to more than one program sponsor. In an example embodiment of the present disclosure, the loyalty currency balance information is based on aggregated loyalty currency units awarded by the same program sponsor corresponding to different products or services subscribed by the user. For example, the program sponsor is a financial institution that issues credit cards and the user owns two different credit cards issued by the same financial institution. In accordance with the loyalty currency balance calculation rules, the loyalty currency balance corresponding to the program sponsor is a sum of the loyalty points awarded to the user on the different credit cards issued by the same program sponsor. The loyalty currency balance information may be presented to the user in a predefined format. Further, in an example embodiment of the present disclosure, presentation module 212 presents the user with the loyalty currency balance information corresponding to a program sponsor, when the loyalty currency balance is above a predefined threshold. The predefined threshold is provided by the program sponsor. In an example embodiment of the present disclosure, presentation module 212 may obtain the loyalty currency balance information and the predefined threshold from sponsor interface module 208 through targeting module 204. In an example embodiment of the present disclosure, presentation module 212 may obtain the loyalty balance information and predefined threshold from user profile module 206. Further, presentation module 212 may present to the user one or more number of loyalty currency units corresponding to the one or more program sponsors in a purchase transaction.

In an example embodiment of the present disclosure, presentation module 212 receives the information corresponding to the number of loyalty currency units corresponding to one or more program sponsor servers 108a, 108b, and 108c used for the purchase transaction from currency converter module 214 and presents the number of loyalty currency units to the user. In an example embodiment of the present disclosure, presentation module 212 presents a confirmation for the user that the choice for paying using the loyalty currency has been accepted and a prompt for the user to complete the purchase transaction. Subsequent to the user completing the purchase transaction, presentation module 212 may inform the user that the purchase transaction will be recorded as a loyalty points purchase transaction. Further, in an example embodiment of the present disclosure, presentation module 212 may also display on the browser a loyalty program name, a logo to identify the sponsoring organization, name of the card member, and/or the payment card associated with the loyalty system. Further, presentation module 212 may also display a marketing or instructive message explaining the prompt or an opt out or turn-off message on the browser.

Payment method module 218 automatically populates payment method details in a payment form. In an example embodiment of the present disclosure, the payment method details are filled in manually by a user in the payment form. Further, payment method module 218 may lock the payment form subsequent to automatic filling of payment method details to prevent the user from editing one or more fields of the payment form. In an example embodiment of the present disclosure, the payment method details may include but are not limited to an account holder name, a credit card number, a debit card number, a Card Verification Value (CVV) number, an expiration date, a prepaid card number, a merchant payment number, and the like. Additionally, payment method module 218 may gather payment method details from sponsor interface module 208 through targeting module 204. In another example embodiment of the present disclosure, a virtual card number or a virtual bank number is generated corresponding to one of the payment method details listed above, thereby enhancing security by not sharing the actual payment method details with the merchant website. Further, this also provides the benefit of obtaining exact transaction details by the browser app 104.

Sponsor interface module 208 interfaces with at least one of program sponsor servers 108a, 108b, and 108c for obtaining the loyalty currency balance information corresponding to a user. In an example embodiment of the present disclosure, sponsor interface module 208, using a web service, periodically extracts loyalty currency balance information and predefined threshold corresponding to a user from at least one of program sponsor servers 108*a*, 108*b*, and 108*c*. In an example embodiment of the present disclosure, sponsor interface module 208 provides the loyalty currency information to targeting module 204. Additionally, sponsor interface module 208 obtains a set of conversion rules from one of program sponsor servers 108*a*, 108*b*, and 108*c* corresponding to a merchant website for converting the total cost of items purchased into loyalty currency units. In an example embodiment of the present disclosure, the set of conversion rules is obtained when the user visits the corresponding merchant website for online shopping. In another example embodiment of the present disclosure, the set of conversion rules corresponding to the various merchant websites in the predefined list of merchant websites is obtained at the launch of browser app 104. In yet another example embodiment of the present disclosure, the set of conversion rules is dynamically downloaded from one of program sponsor servers 108*a*, 108*b*, and 108*c*. In an example embodiment of the present disclosure, sponsor interface module 208 provides the set of conversion rules to currency converter module 214. Further, sponsor interface module 208 may also obtain information corresponding to the predetermined threshold of loyalty currency balance required for providing the user with an option for online shopping using loyalty currency. Sponsor interface module 208 may obtain this information from one of program sponsor servers 108*a*, 108*b*, and 108*c*. In an example embodiment of the present disclosure, sponsor interface module 208 provides the information corresponding to the predetermined threshold to targeting module 204. In an example embodiment of the present invention, the program sponsor servers 108*a*, 108*b*, and 108*c* may provide sponsor interface module 208 one or more of a list of merchant websites where the loyalty points may be redeemed, a list of merchant websites where the loyalty points may not be redeemed, list of type of card members, such as gold card member, platinum card member, who may avail the loyalty points redeeming service, and the like. Additionally, the program sponsor servers 108*a*, 108*b*, and 108*c* may provide sponsor interface module 208 a specific time frame, such as the time around major holidays, during which the service will be available. Thereafter, sponsor interface module 208 may provide the above obtained information to targeting module 204.

Targeting module 204 selects a loyalty currency payment option to be offered to the user when the loyalty currency balance is greater than the number of loyalty currency units required for completing a purchase transaction. In a scenario when the user has multiple loyalty currency accounts with more than one loyalty currency balance greater than the number of loyalty currency units required to complete the purchase transaction, targeting module 204 may select the loyalty currency payment option to be presented. Targeting module 204 may select the loyalty currency payment option based on the merchant website, the total cost of items, the loyalty currency balance information, and user preferences. In an example embodiment of the present disclosure, the user preferences are derived from previous online activities of the user tracked by tracking module 210. In another scenario, when the loyalty currency balance of the user is less than number of loyalty currency units required for completing a purchase transaction, targeting module 204 may select an option to be provided to the user which entails paying for the items to be purchased using a combination of real currency units and loyalty currency units. Therefore, the user may choose to pay the partial purchase amount using the loyalty currency units and the remaining purchase amount using the real currency units. In still another scenario, targeting module 204 may select an option to be provided to the user which entails paying for the items to be purchased using a combination of real currency units and loyalty currency units, when the loyalty currency balance of the user is not less than number of loyalty currency units required for completing a purchase transaction. In such a scenario, the user may inquire about the amount of the purchase that may be paid using a specified number of loyalty points. The user may thereafter pay for that amount using the loyalty points and the remaining amount of the purchase using real currency.

Currency converter module 214 receives the set of conversion rules from sponsor interface module 208 and the total cost of items to be purchased by the user at a merchant website from tracking module 210. Currency converter module 214 then converts the total cost of items to be purchased into equivalent number of loyalty currency units using the set of conversion rules. Thereafter, currency converter module 214 provides the equivalent number of loyalty currency units to targeting module 204. Further, in a scenario when the user intends to pay for the items to be purchased using a combination of real currency units and loyalty currency units, currency converter module 214 provides the amount of the purchase that may be paid using a specified number of loyalty points.

Transaction report module 216 captures purchase transaction information and reports the purchase transaction information to the corresponding program sponsor. In an example embodiment of the present disclosure, the purchase transaction information includes but is not limited to a monetary value of the purchase transaction and a Uniform Resource Locator (URL) of the merchant website at which the user performed the purchase transaction, user identification, number of loyalty units redeemed, information related to partial or complete payment done through loyalty points, and the like. The program sponsor based on the received report takes appropriate action at its end to debit loyalty points from the loyalty points balance of the user and to apply a credit to the real currency purchase.

In the various example embodiments of the present disclosure, targeting module 204 acts as an interface between all the modules such as authentication module 202, user profile module 206, sponsor interface module 208, tracking module 210, presentation module 212, currency converter module 214, and transaction report module 216. The interfacing performed by targeting module 204 entails determining a context from the information received from a first module and determining a suitable response to the context. Based on the determined response, targeting module 204 may direct a module to perform a suitable action. In an example, when presentation module 212 interacts with tracking module 210, the communication is performed through targeting module 204. Targeting module 204 determines the context from the information received from tracking module 210. For example, if tracking module 210 informs targeting module 204 that the user is visiting a merchant website, targeting module 204 acts upon this information and directs presentation module 212 to display loyalty points balance information to the user. Thereafter, tracking module 210 may record the user reaction to the balance information presented to the user. In another example, when sponsor interface module 208 communicates with presentation module 212, the communication is performed through targeting module 204.

Figure 3:
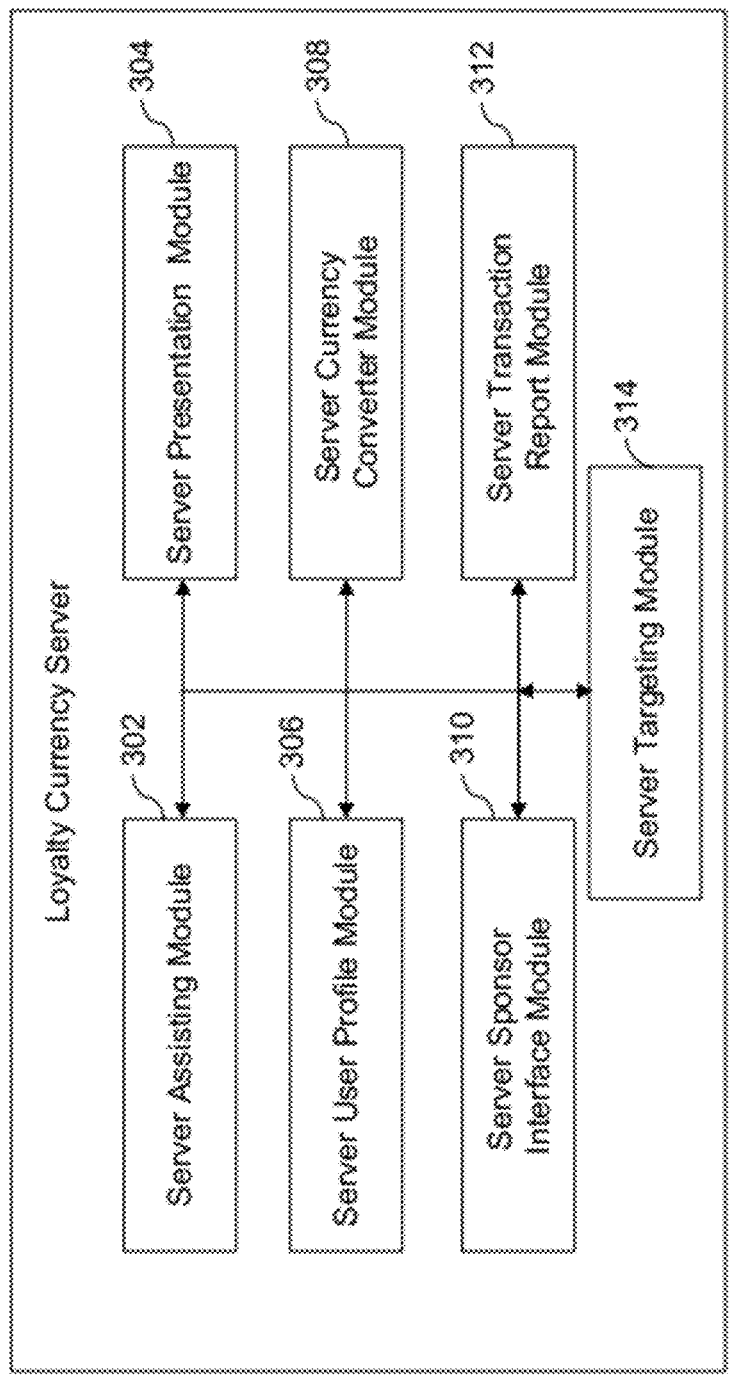
FIG. 3 is a block diagram of a loyalty currency server in detail, in accordance with an example embodiment of the present disclosure.

Referring now to FIG. 3, loyalty currency server 110 is shown in detail, in accordance with an embodiment of the present disclosure. Loyalty currency server 110 includes server assisting module 302, server presentation module 304, server user profile module 306, server currency converter module 308, server sponsor interface module 310, server transaction report module 312 and server targeting module 314.

In an embodiment of the present disclosure, server assisting module 302, server presentation module 304, server user profile module 306, server currency converter module 308, server sponsor interface module 310, server transaction report module 312 and server targeting module 314 may be located in loyalty currency server 110. In such a scenario, server presentation module 304, server user profile module 306, server currency converter module 308, server sponsor interface module 310, server transaction report module 312 and server targeting module 314 perform similar functionalities as performed by their counterparts explained in conjunction with FIG. 2 above. For example, server presentation module 304 stores the various presentation designs and styles that will be invoked when requested by presentation module 212. Further, server assisting module 302 performs the authentication functionalities when requested by authentication module 202. Server currency converter module 308 converts the real currency units into loyalty currency units when requested by currency converter module 214. Server sponsor interface module 310 interfaces with program sponsors 108a, 108b, and 108c for accessing data in aggregate format corresponding to all users, or for a specific user. In an embodiment of the present invention, server sponsor interface module 310 maintains the 'single sign-on' mechanism to securely exchange information with program sponsors 108a, 108b, and 108c. Server transaction report module 312 collects information, in aggregate format corresponding to all users, or for a specific user, from transaction module 216, and sends the information to program sponsors 108a, 108b, and 108c. Further, server user profile module 306 periodically provides the user information upon a request by user profile module 206.

Figure 4A:
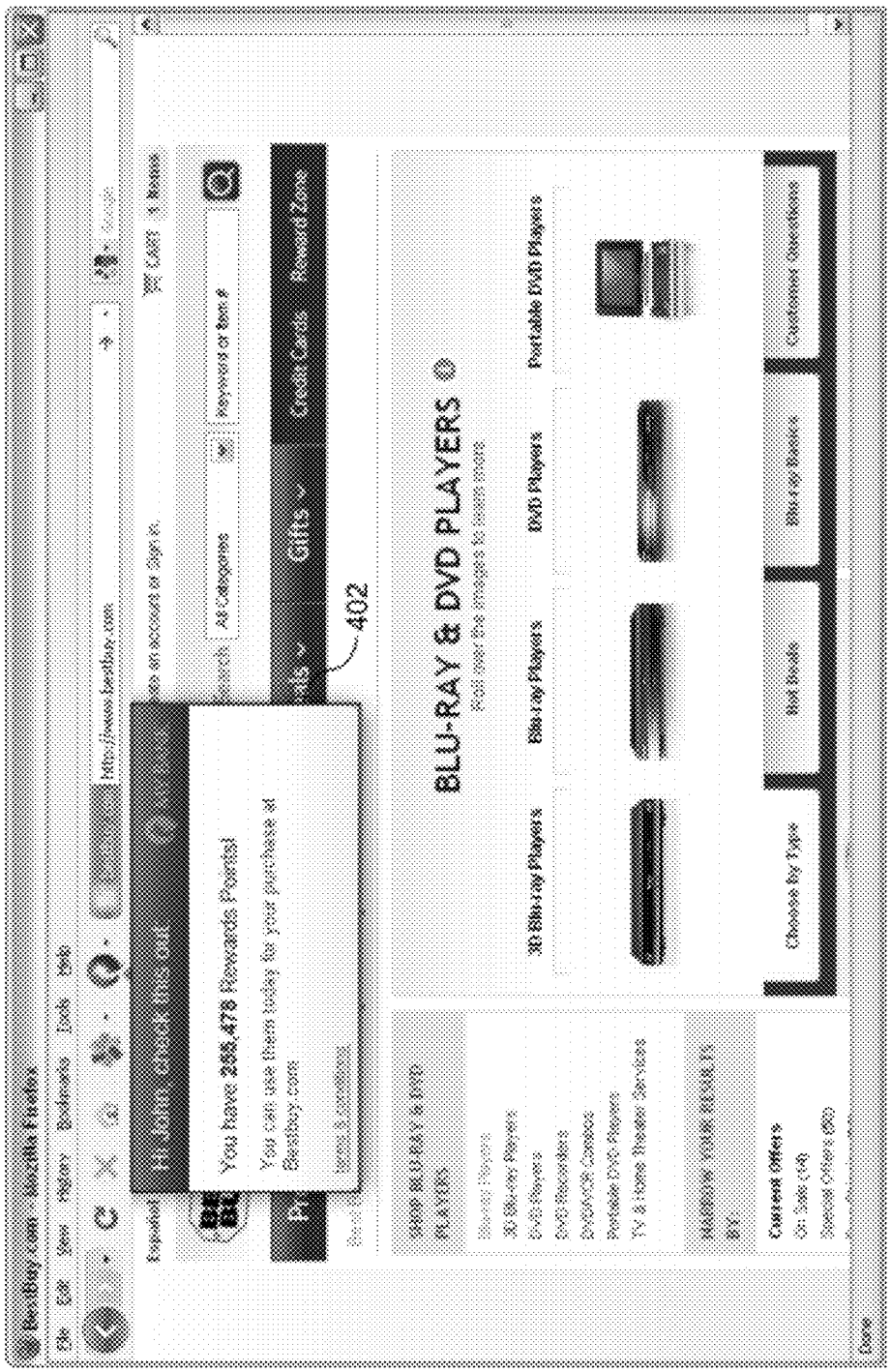
FIG. 4A provides a screenshot of an internet browser running a browser app, in accordance with an example embodiment of the present disclosure.
Figure 4B:
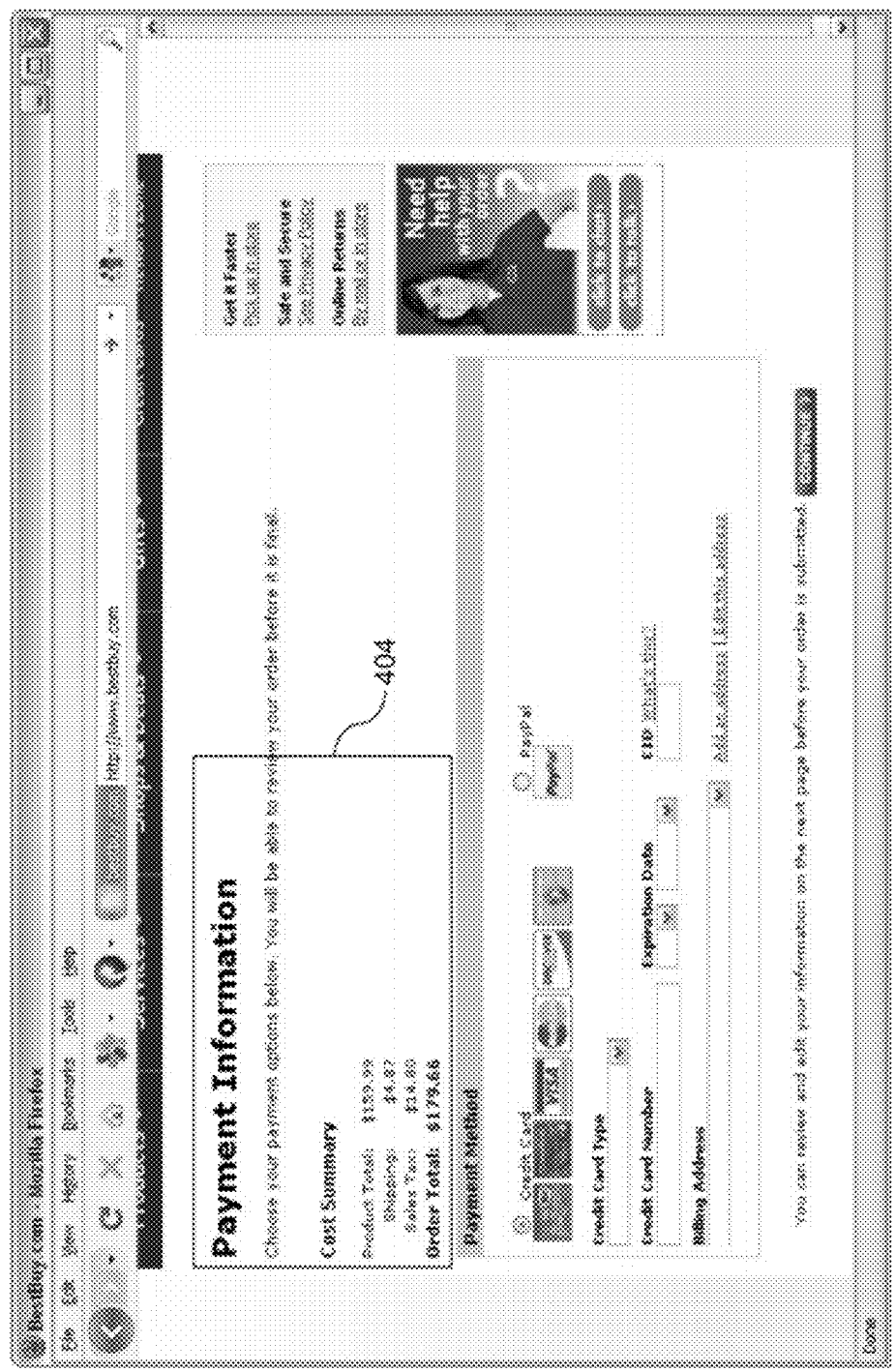
FIG. 4B provides a screenshot of an internet browser running a browser app, in accordance with an example embodiment of the present disclosure.
Figure 4C:
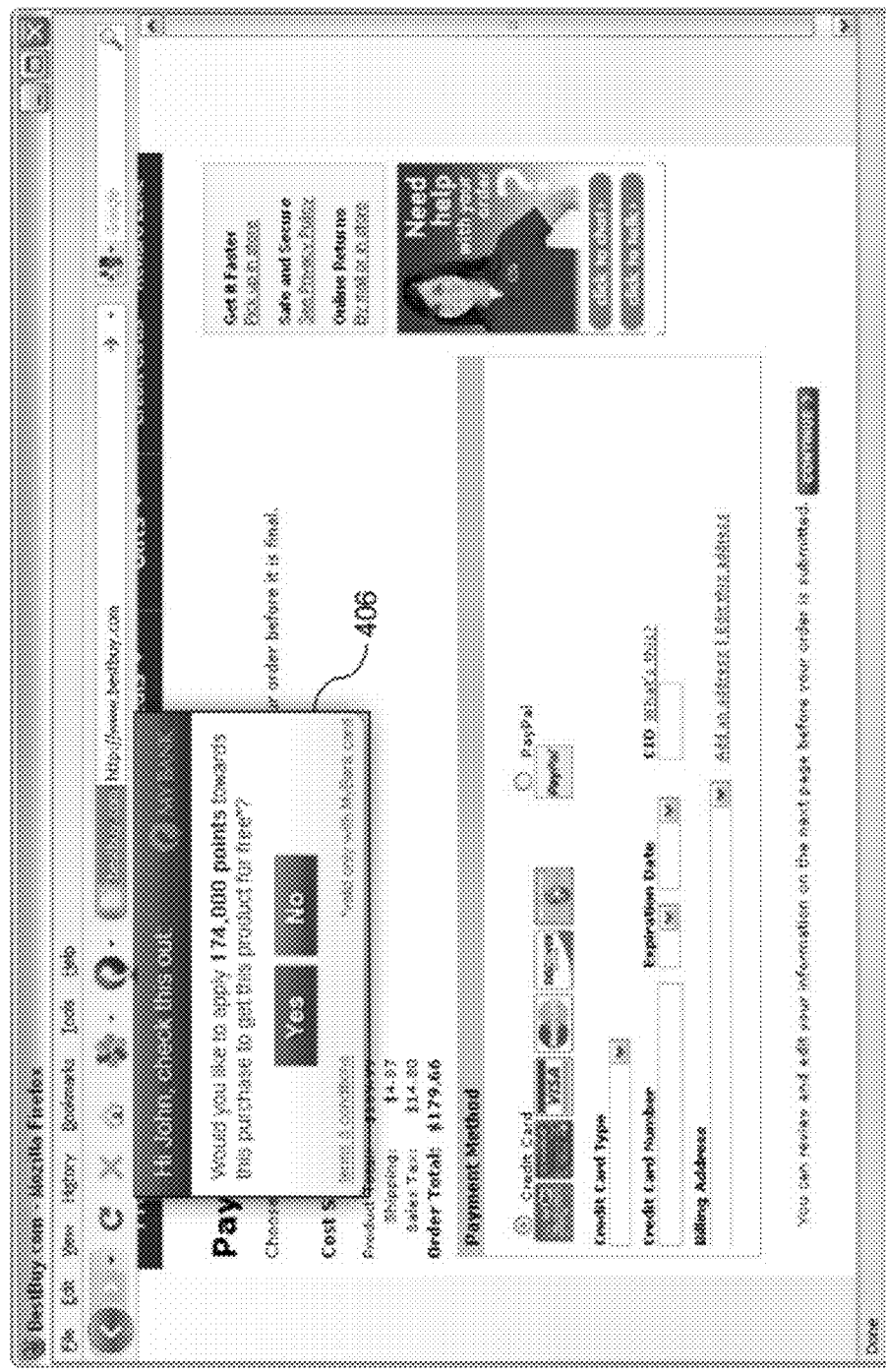
FIG. 4C provides a screenshot of an internet browser running a browser app, in accordance with an example embodiment of the present disclosure.
Figure 4D:
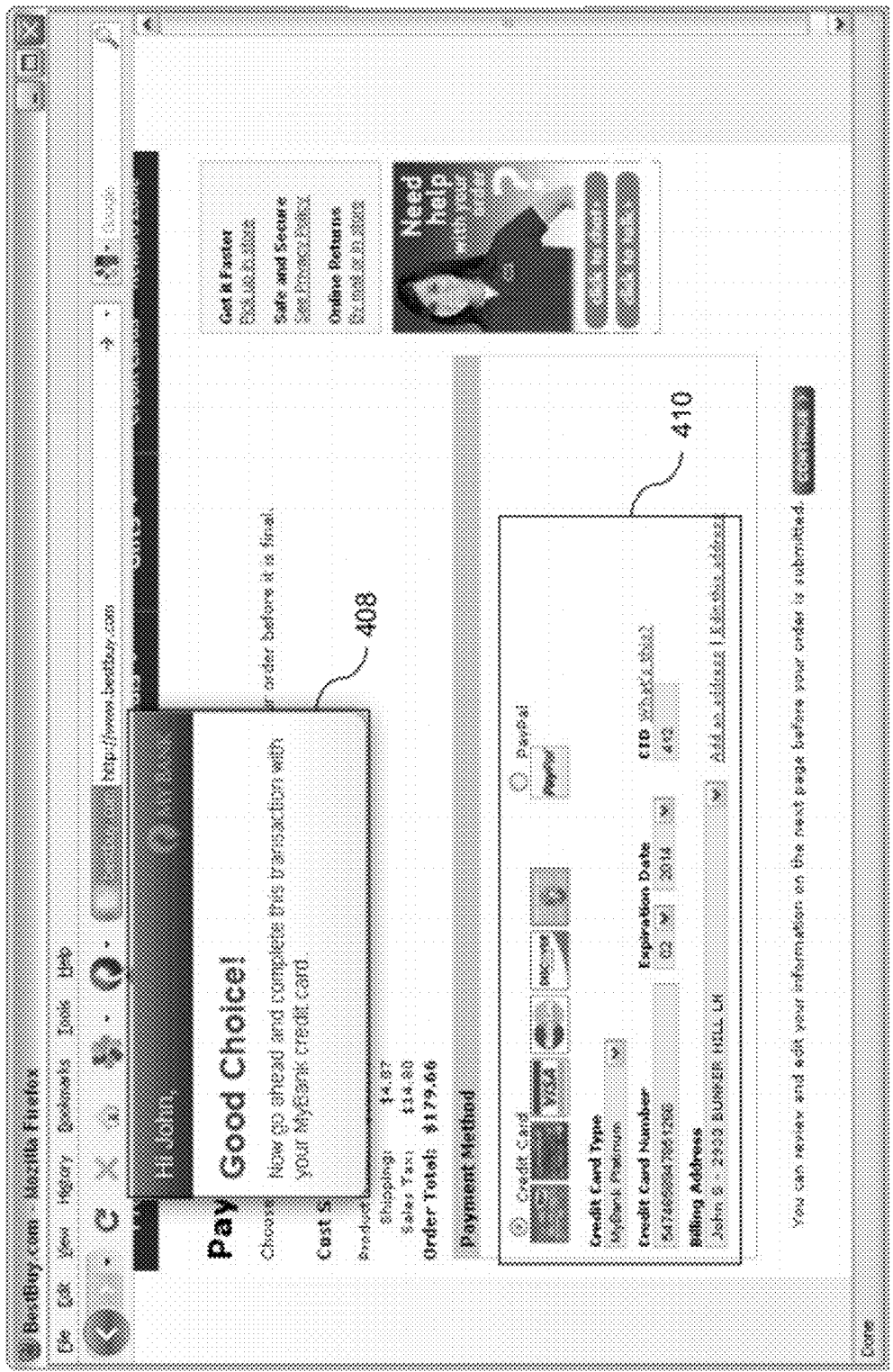
FIG. 4D provides a screenshot of an internet browser running a browser app, in accordance with an example embodiment of the present disclosure.
Figure 4E:
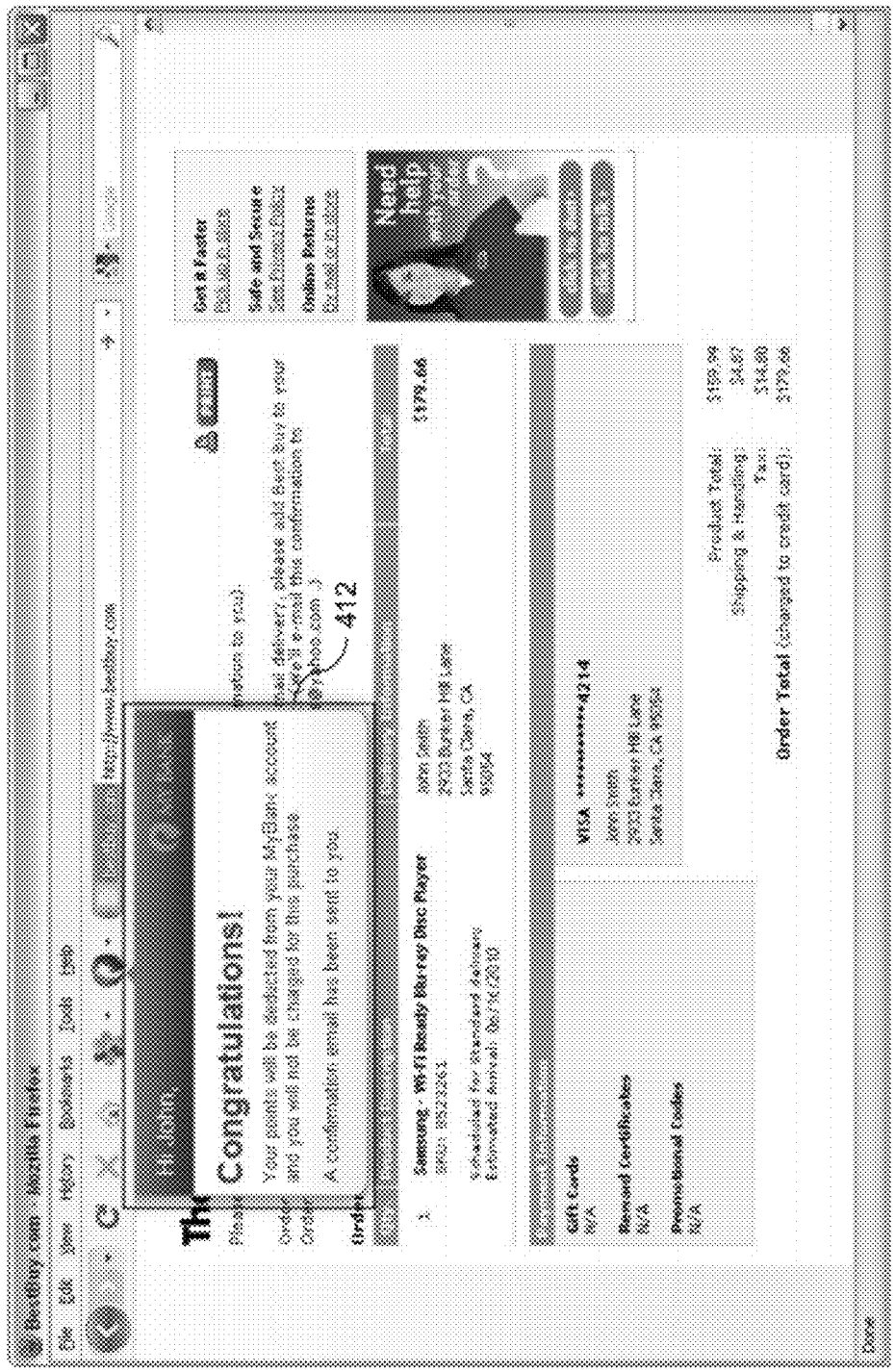
FIG. 4E provides a screenshot of an internet browser running a browser app, in accordance with an example embodiment of the present disclosure.

Referring now to FIGS. 4A, 4B, 4C, 4D, and 4E screenshots of an internet browser with browser app running are shown in accordance with an example embodiment of the present disclosure. FIG. 4A includes balance information box 402. FIG. 4B includes payment information box 404. FIG. 4C includes loyalty currency option box 406. FIG. 4D includes confirmation box 408 and payment form 410. FIG. 4E includes transaction completion box 412.

Referring now to FIG. 4A, balance information box 402 may include loyalty currency balance information. The loyalty currency balance information is displayed on the browser by presentation module 212 (refer FIG. 2) as explained in detail in conjunction with FIG. 2 above. Further, presentation module 212 may also display on the browser a loyalty program name, a logo to identify the sponsoring organization, name of the card member, and the payment card associated with the loyalty system among other information. Further, presentation module 212 may also display a marketing or instructive message explaining the prompt or an opt-out or turn-off message on the browser.

Referring now to FIG. 4B, payment information box 404 includes the total cost of items being purchased by the user. The total cost of items to be purchased is tracked by tracking module 210 and sent to currency converter module 214. In an embodiment of the present disclosure, a total cost of items to be purchased by the user may include shipping costs and taxes, as applicable, in addition to the cost of items.

Referring now to FIG. 4C, loyalty currency option box 406 may include an option for the user to pay for the total cost of items being purchased using the loyalty currency. The option to pay using the loyalty currency may be presented to the user by presentation module 212 when the loyalty currency balance information is greater than the number of loyalty currency units required to complete the purchase transaction as explained in detail in conjunction with FIG. 2.

Referring now to FIG. 4D, confirmation box 408 may include a confirmation for the user that the choice for paying using the loyalty currency has been accepted and a prompt for the user to complete the purchase transaction. In an example embodiment of the present disclosure, confirmation box 408 is presented to the user by presentation module 212. Further, payment form 410 may include the payment method details.

Referring now to FIG. 4E, transaction completion box 412 may include a confirmation for the user relating to the payment details such as the payment mode in which the transaction has been performed. The payment mode may include payment performed completely using loyalty currency units or a combination of real currency units and loyalty currency units.

Figure 5:
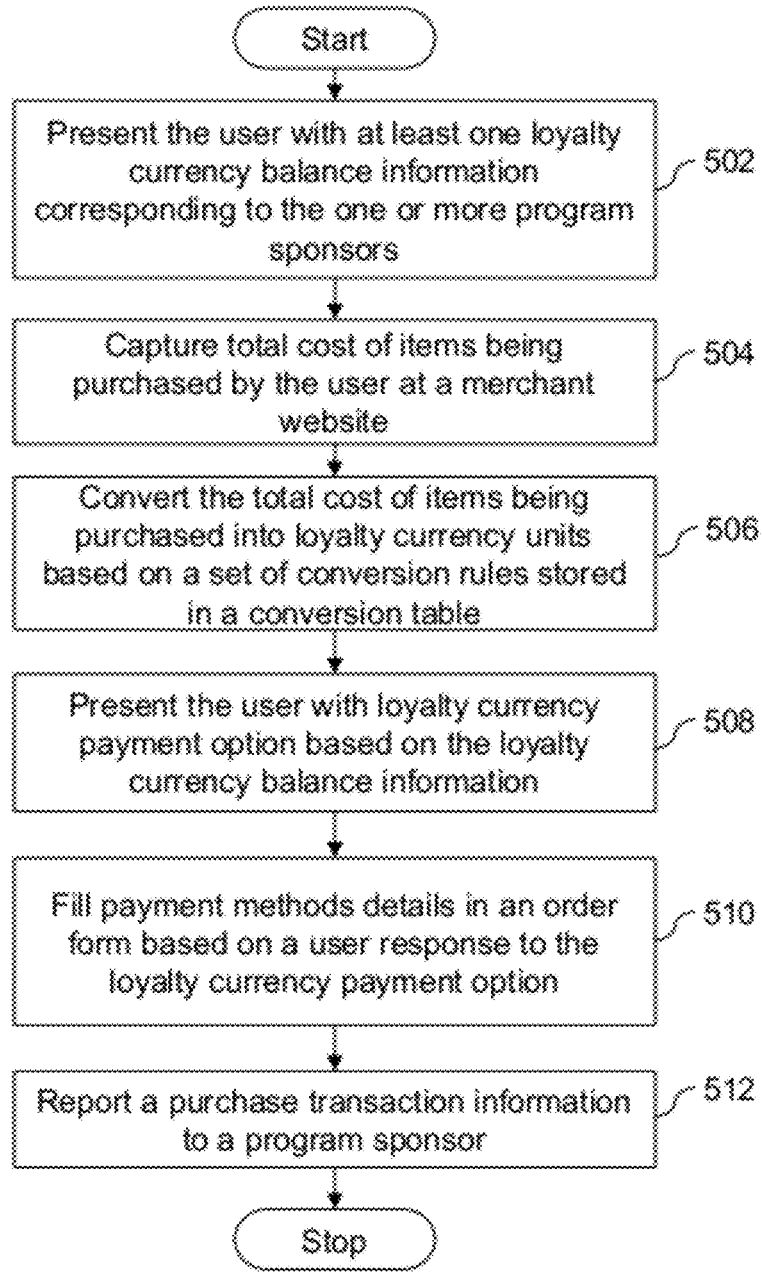
FIG. 5 is a flowchart of a method for paying with loyalty points during online shopping using a browser app, in accordance with an example embodiment of the present disclosure.

Referring now to FIG. 5, a flowchart is provided illustrating a method for paying with loyalty currency at one or more merchant websites by a user using a browser app, in accordance with an embodiment of the present disclosure. FIG. 5 will now be explained in detail in conjunction with FIGS. 2, 4A, 4B, 4C, 4D and 4E.

In block 502, a user is presented with loyalty currency balance information corresponding to a program sponsor. In an example embodiment of the present disclosure, loyalty currency balance information is presented in balance information box 402. In an example embodiment of the present disclosure, loyalty currency includes at least one of a loyalty points, membership points, reward points, mileage points, miles, e-vouchers, coupons, and the like. In an embodiment of the present disclosure, the loyalty currency balance information includes number of loyalty currency units credited to the user by the one or more program sponsors. In an example embodiment of the present disclosure, the program sponsor is at least one of a banking institution, a financial institution, a credit card company, an airline, a super market, a grocery store, and a convenience store. In an example embodiment of the present disclosure, the loyalty currency balance information is based on aggregated loyalty currency units awarded by the same program sponsor corresponding to different products or services subscribed by the user.

For example, this is the case in a scenario when the program sponsor is a financial institution that issues a credit card and the user owns two different credit cards issued by the same financial institution. In accordance with the loyalty currency balance calculation rules, the loyalty currency balance corresponding to the program sponsor is a sum of the loyalty points awarded to the user on the different credit cards issued to the user by the same financial institution. The loyalty currency balance information is presented to the user in a predefined format. In an example embodiment of the present disclosure, a presentation module, such as presentation module 212, presents the user with the loyalty currency balance information corresponding to a program sponsor, when the loyalty currency balance is above a predefined threshold. The predefined threshold is provided by the program sponsor. In an example embodiment of the present disclosure, the loyalty currency balance information is presented to the user when the user visits a merchant website. In an example embodiment of the present disclosure, the loyalty currency balance information is presented to the user when the user visits a merchant website that belongs to a predefined list of merchant websites. In an example embodiment of the present disclosure, a tracking module, such as tracking module 210, informs presentation module 212 that the user is visiting one of a merchant website through targeting module 204. Thereafter, presentation module 212 may present the user with the loyalty balance information. In an example embodiment of the present disclosure, presentation module 212 may obtain the loyalty balance information and predefined threshold from user profile module 206 through targeting module 204. Thereafter, presentation module 212 may present the user with the loyalty balance information.

In block 504, total cost of items to be purchased at a merchant website is captured. In an example embodiment of the present disclosure, the total cost of items to be purchased by the user at a merchant website, as displayed in payment information box 404, is captured by tracking module 210.

In block 506, the total cost of items to be purchased is converted into loyalty currency units based on a set of conversion rules stored in a conversion table by a currency converter module, such as a currency converter module 214. In an example embodiment of the present disclosure, the conversion table is stored at a computing device. In another example embodiment of the present disclosure, the set of conversion rules is dynamically downloaded from a program sponsor server by currency converter module 214 when the user initiates a purchase transaction at a merchant website. In yet another example embodiment of the present disclosure, the set of currency conversion rules is obtained from a program sponsor server by a sponsor interface module, such as a sponsor interface module 208 as explained in detail in conjunction with FIG. 2. In an example embodiment of the present disclosure, the total cost of items to be purchased is provided to currency converter module 214 by tracking module 210 through targeting module 204.

In block 508, the user is presented with the loyalty currency payment option in loyalty currency option box 406 corresponding to at least one program sponsor. The loyalty currency payment option may be presented based on the loyalty currency balance information. In an example embodiment of the present disclosure, the loyalty currency payment option is presented to the user when the loyalty currency balance corresponding to a program sponsor is greater than the number of loyalty currency units required to complete the purchase. In a scenario when the user has multiple accounts with different program sponsors, one or more loyalty currency payment options may be provided to the user. The loyalty currency balances which are greater than the number of loyalty currency units required to complete the transaction may be presented to the user as buying options. In an example embodiment of the present disclosure, targeting module 204 selects the program sponsor corresponding to which the loyalty currency payment option is to be presented to the user when the user has multiple loyalty currency accounts having loyalty currency balances greater than required to complete the purchase transaction. Targeting module 204 may select the loyalty currency payment option based on the merchant website, the total cost of items to be purchased, the loyalty currency balance information, and one or more user preferences, in which the user preferences are derived from previous online activities of the user tracked by tracking module 210.

In a scenario in which the loyalty currency balance is less than the number of loyalty currency units required to complete the purchase transaction and is greater than the predefined threshold, the user is presented with the loyalty currency payment option. The user may then pay for the purchase transaction using a combination of loyalty currency units and one of a regular payment method such as a debit card, credit card, merchant card, and a prepaid card.

In block 510, payment method details are filled in payment form box 410 based on a user response to the loyalty currency payment option without the user input. In an example embodiment of the present disclosure, the payment details are filled in the payment form box 410 by payment method module 218. Exemplary payment method details may be an account holder name, a credit card number, a debit card number, a Card Verification Value (CVV) number, an expiration date, a prepaid card number, and a merchant payment number among other information. In an embodiment of the present disclosure, the payment methods details are filled by accessing the payment methods details from either the computing device or the network. Examples of accessing the payment methods details from the network may include digital wallet applications.

Further, when the loyalty currency issuing institution is a non-financial institution, for example when the program sponsor is an airline issuing travel miles, the payment method may not be one of the regular payment methods such as a debit card, a credit card, a merchant card, and a prepaid card. In such a scenario, a virtual prepaid card may be generated by browser app 104. The virtual prepaid card may have a monetary value equal to the monetary value of the purchase transaction and the virtual prepaid card may expire at the end of the purchase transaction. Further, in an example embodiment of the present disclosure, confirmation box 408 is presented to the user informing the user that the choice of paying with loyalty currency has been accepted and then prompting the user to complete the transaction. In an example embodiment of the present disclosure, confirmation box 408 is presented to the user by presentation module 212. In an example embodiment of the present disclosure, the payment method details are filled manually by the user in payment form box 410.

Further, in an example embodiment of the present disclosure, subsequent to filling the payment method details, payment form box 410 is locked to prevent the user from editing fields in payment form box 410. Further, payment form box 410 may be locked by payment method module 218.

In block 512, purchase transaction information is reported to a corresponding program sponsor. In an example embodiment of the present disclosure, the purchase transaction information includes but is not limited to a monetary value of the purchase transaction, Uniform Resource Locator (URL) of the merchant website at which the user performed the purchase transaction, user identification, number of loyalty currency units redeemed, information related to partial or complete payment done through loyalty points, and the like. In an example embodiment of the present disclosure, the purchase transaction information is reported to the program sponsor by transaction report module, such as transaction report module 216 In a scenario in which the payment has been done using a virtual prepaid card, more specific and precise information about the completed transaction may be reported to the program sponsor by transaction report module 216.

Further, in an example embodiment of the present disclosure, the merchant website records the purchase transaction to be completed using one or more payment methods such as a debit card, a credit card, a merchant payment card, a prepaid card. In an example embodiment of the present disclosure, the program sponsor records that the purchase transaction is completed using the loyalty currency and debits loyalty points from the user's loyalty points balance and applies a credit for the real currency purchase. Thereafter the method may terminate.

The flow chart of FIG. 5 shows the architecture, functionality, and operation of a possible implementation of loyalty currency payment software. In this regard, each block may represent a module, segment, or portion of code, which comprises one or more executable instructions for implementing the specified logical function(s). It should also be noted that in some alternative implementations, the functions noted in the blocks may occur out of the order noted in FIG. 5. For example, two blocks shown in succession in FIG. 5 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Although the present disclosure has been described in detail, it should be understood that various changes, substitutions and alterations may be made thereto without departing from the spirit and scope of the invention as defined by the appended claims.

What is claimed is:

1. A method for paying with loyalty currency during online payment at any merchant website by a user using a payment assistant plug-in residing on a browser, the payment assistant plug-in being independent of any merchant website, the loyalty currency being provided by one or more program sponsors, the method comprising:
   automatically presenting loyalty currency balance information for the user corresponding to the one or more program sponsors, when the user visits one or more merchant websites;
   converting, using a computing device, total cost of items to be purchased into one or more loyalty currency units based on a set of one or more conversion rules stored in a conversion table;
   receiving a confirmation from the user to use the converted loyalty currency units for a purchase transaction at a merchant website;
   filling payment methods details using a payment method in a payment form based on the received confirmation;
   presenting a confirmation message to the user that a purchase transaction has been completed by paying with loyalty currency at the merchant website, irrespective of whether the merchant website supports paying with loyalty currency; and
   reporting purchase transaction information to at least one of the one or more program sponsors after completing the purchase transaction,
   wherein the method is implemented on a computing device.

2. The method of claim 1, wherein the loyalty currency comprises at least one of loyalty points, membership points, reward points, mileage points, e-vouchers, coupons, and miles.

3. The method of claim 1, further comprising:
   capturing the total cost of items to be purchased by the user at the merchant website; and
   presenting the user with at least one loyalty currency payment option based on the loyalty currency balance information, the at least one loyalty currency payment option is presented to pay for a purchase transaction at the merchant website using the loyalty currency, wherein the loyalty currency balance information is presented to the user based on tracking the one or more websites that the user visits.

4. The method of claim 3, wherein the loyalty currency balance information comprises number of loyalty currency units credited to the user by the one or more program sponsors.

5. The method of claim 3, wherein the user visiting the one or more merchant websites is presented with the loyalty currency balance information when the loyalty currency balance is above a predetermined threshold.

6. The method of claim 1, wherein the merchant website belongs to a predefined list of one or more merchant websites provided by at least one program sponsor.

7. The method of claim 1, wherein the loyalty currency balance information is based on aggregated loyalty currency units computed from one or more loyalty currency corresponding to a program sponsor for the user.

8. The method of claim 1, wherein the set of conversion rules is dynamically downloaded from a program sponsor server when the user initiates a purchase transaction at a merchant website.

9. The method of claim 3, wherein the user is presented with the at least one loyalty currency payment option when loyalty currency balance corresponding to a program sponsor is greater than the number of loyalty currency units required to complete the purchase transaction.

10. The method of claim 1, wherein the purchase transaction is completed by paying using a combination of one or more loyalty currency units and at least one payment method.

11. The method of claim 1, wherein the payment methods comprise at least one of using a credit card, a debit card, a prepaid card, and a merchant card.

12. The method of claim 1, wherein the payment methods comprise a virtual prepaid card automatically generated by the payment assistant plug-in in real-time having a monetary value equal to the monetary value of the purchase transaction, wherein the virtual prepaid card expires at the end of the purchase transaction.

13. The method of claim 1, wherein the payment methods further comprise at least one of a virtual card number and a virtual bank number, the virtual card number and/or the virtual bank number generated corresponding to the one or more payment methods.

14. The method of claim 1, wherein the user stores details of the payment methods on the at least one of the computing device and over the network, wherein the details of the payment methods comprise at least one of an account holder name, a credit card number, a debit card number, a Card Verification Value (CVV) number, an expiration date, a prepaid card number, and a merchant card number.

15. The method of claim 1, wherein the details of the payment methods are filled in the payment form by accessing the details of the payment methods from at least one of the computing device and the network.

16. The method of claim 1, further comprising automatically locking the payment form at the merchant website from user editing subsequent to filling the payment methods details.

17. The method of claim 1, further comprising recognizing completion of the purchase, wherein the merchant website records the purchase to be completed using the payment methods, wherein the program sponsor records the purchase to be completed using the loyalty currency.

18. The method of claim 1, wherein the one or more program sponsors is at least one of a banking institution, a financial institution, a credit card company, an airline, a super market, and a convenience store.

19. The method of claim 1, wherein the payment method details are filled manually by the user in the payment form.

20. The method of claim 1, wherein the one or more program sponsors provide one or more business rules.

21. A system for paying with loyalty currency during online payment at any merchant website by a user using a payment assistant plug-in residing on a browser, the payment assistant plug-in being independent of any merchant website, the loyalty currency being provided by one or more program sponsors, the system comprising:
 a processor; and
 a memory coupled to the processor, wherein the processor is configured to execute the payment assistant plug-in residing on the browser in the memory, the payment assistant plug-in comprising:
  a tracking module configured to:
   I. track one or more websites the user visits;
   II. capture total cost of items to be purchased by the user at a merchant website;
   III. track a user response to at least one loyalty currency payment option presented to the user, the at least one loyalty currency payment option is presented to pay for a purchase transaction using the loyalty currency; and
   IV. receive a confirmation from the user to use converted loyalty currency units for a purchase transaction at the merchant website;
  a presentation module configured to:
   I. present to the user in a predefined format at least one loyalty currency balance information corresponding to the one or more program sponsors without a user input, when the user visits the one or more merchant websites;
   II. present to the user in the predefined format one or more number of loyalty currency units corresponding to the one or more program sponsors required for a purchase transaction; and
   III. present a confirmation message to the user that the purchase transaction has been completed by paying with loyalty currency at the merchant website, irrespective of whether the merchant website supports paying with loyalty currency;
  a currency converter module configured to convert the total cost of items to be purchased into the one or more loyalty currency units needed for completing a purchase transaction, and to provide the number of one or more loyalty currency units needed for completing the purchase transaction to the presentation module; and
  a transaction report module configured to capture a purchase transaction information and reporting the purchase transaction information to at least one of the one or more program sponsors,
   wherein the payment assistant plug-in is connected to a loyalty currency server, the loyalty currency server hosts one or more rules for operating the loyalty currency client,
   wherein the payment assistant plug-in is installed at a computing device, the payment assistant plug-in interacting with the one or more program sponsors over a network.

22. The system of claim 21, further comprising a sponsor interface module configured to interface with at least one program sponsor server and to obtain at least one of:
 loyalty currency balance information corresponding to the user;
 a set of conversion rules corresponding to a merchant website for converting the total cost of items to be purchased into loyalty currency units;
 information on merchants where the payment by loyalty currency service is to be provided;
 a list of users for whom the payment by loyalty currency service is to be enabled; and
 a predetermined threshold of loyalty currency balance required corresponding to the at least one program sponsor.

23. The system of claim 21, wherein the loyalty currency server interacts with the payment assistant plug-in and the at least one program sponsor server over the network.

24. The system of claim 21, further comprising an authentication module configured to authenticate the user with at least one of the payment assistant plug-in browser app and the loyalty currency server.

25. The system of claim 21, further comprising a user profile module configured to extract of one or more user profiles from at least one of the loyalty currency server and one or more program sponsors, wherein the information comprises at least one of an account holder name, a credit card number, a debit card number, a Card Verification Value (CVV) number, an expiration date, a prepaid card number, and a merchant card number.

26. The system of claim 21, further comprising a targeting module configured to:
  interface between at least two of:
    the presentation module;
    the tracking module;
    the currency converter module; and
    the transaction report module;
  select at least one loyalty currency payment option to be offered to the user when the at least one loyalty currency balance is greater than number of loyalty currency units required to complete the purchase transaction; and
  select the at least one loyalty currency payment option based on at least one of the merchant website, the total cost of items to be purchased, the loyalty currency balance information, and one or more user preferences.

27. The system of claim 21, further comprising a payment method module configured to automatically lock a payment form from user editing subsequent to filling one or more payment method details.

28. The system of claim 21, wherein the purchase transaction information comprises at least one of a monetary value of the purchase transaction and an address of the merchant website at which the user performed the purchase transaction.

29. A computer program product comprising computer-executable instructions embodied in a non-transitory computer-readable medium for use in connection with a processor-containing system, for performing steps comprising:
  presenting a user with at least one loyalty currency balance information corresponding to one or more program sponsors automatically when the user visits one or more merchant websites, the loyalty currency balance information is presented based on tracking one or more websites that the user visits;
  converting total cost of items to be purchased into one or more loyalty currency units based on a set of one or more conversion rules stored in a conversion table, wherein the set of one or more conversion rules corresponds to a program sponsor, wherein each conversion rule corresponds to a merchant website;
  presenting the user with at least one loyalty currency payment option based on the at least one loyalty currency balance information, the at least one loyalty currency payment option is presented to pay for a purchase transaction using the loyalty currency, wherein the user is presented with the at least one loyalty currency payment option when the loyalty currency balance is greater than the number of loyalty currency units required to complete a purchase transaction;
  receiving a confirmation from the user to use the converted loyalty currency units for the purchase transaction at the merchant website;
  automatically filling details of one or more payment methods in a payment form based on the received confirmation;
  presenting a confirmation message to the user that the purchase transaction has been completed by paying with loyalty currency at the merchant website, irrespective of whether the merchant website supports paying with loyalty currency; and
  reporting information of the purchase transaction to a program sponsor, wherein the information comprises at least one of a number of loyalty currency units utilized for the purchase transaction and an address of the merchant website at which the user performed the purchase transaction.

* * * * *